United States Patent [19]

Kadin

[11] Patent Number: 4,597,087
[45] Date of Patent: Jun. 24, 1986

[54] FREQUENCY HOPPING DATA COMMUNICATION SYSTEM

[75] Inventor: Joseph Kadin, Florham Park, N.J.

[73] Assignee: ITT Corporation, New York, N.Y.

[21] Appl. No.: 662,489

[22] Filed: Oct. 19, 1984

[51] Int. Cl.⁴ .............................................. H04K 1/00
[52] U.S. Cl. ...................................... 375/1; 375/115; 370/105
[58] Field of Search ....................... 375/1, 2.1, 2.2, 45, 375/48, 62, 89, 115, 88, 91; 370/107; 455/1, 26, 27, 42; 178/22.01

[56] References Cited

U.S. PATENT DOCUMENTS

| | | | |
|---|---|---|---|
| 3,411,089 | 11/1968 | Gicca | 375/58 |
| 3,916,313 | 10/1975 | Lowry | 375/1 |
| 4,193,030 | 3/1980 | Rabow et al. | 375/2 |
| 4,280,222 | 7/1981 | Flower | 375/1 |

Primary Examiner—Benedict V. Safourek
Assistant Examiner—Stephen Chin
Attorney, Agent, or Firm—John T. O'Halloran; Jeffrey P. Morris

[57] ABSTRACT

The frequency hopping data communications system comprises a first circuit arrangement to produce identical first and second pseudo-noise code streams time displaced with respect to each other, each of the first and second code streams producing a frequency hopping rate equal to n times the rate of binary data being transmitted, where n is an integer; a second circuit arrangement coupled to the first circuit arrangement, the second circuit arrangement being responsive to the data and the first and second code streams to provide a modulated signal for conveying the data, the modulated signal having different randomly occurring frequencies representing both binary conditions of the data and random spacing between the randomly occurring frequencies representing each of the binary conditions of the data, each bit of the data being represented by n of the randomly occurring frequencies; a third circuit arrangement coupled to the second circuit arrangement to receive the modulated signal and to separate the randomly occurring frequencies representing each of the binary conditions from the received modulated signal; a fourth circuit arrangement coupled to the third circuit arrangement to recover the data from the separated, received modulated signal; and a fifth circuit arrangement coupled to the third circuit arrangement and the fourth circuit arrangement to synchronize the third circuit arrangement to the received modulated signal.

42 Claims, 6 Drawing Figures

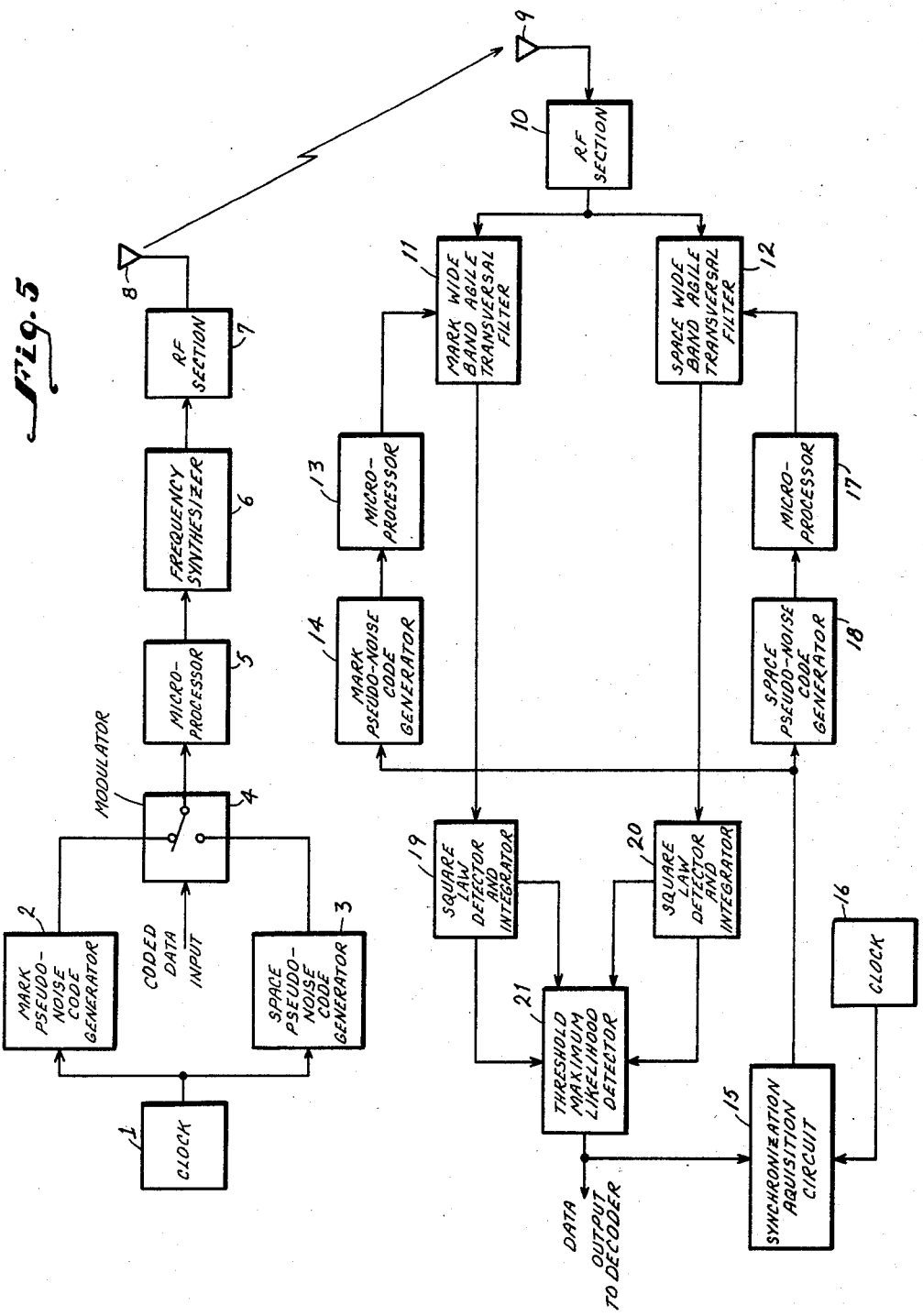

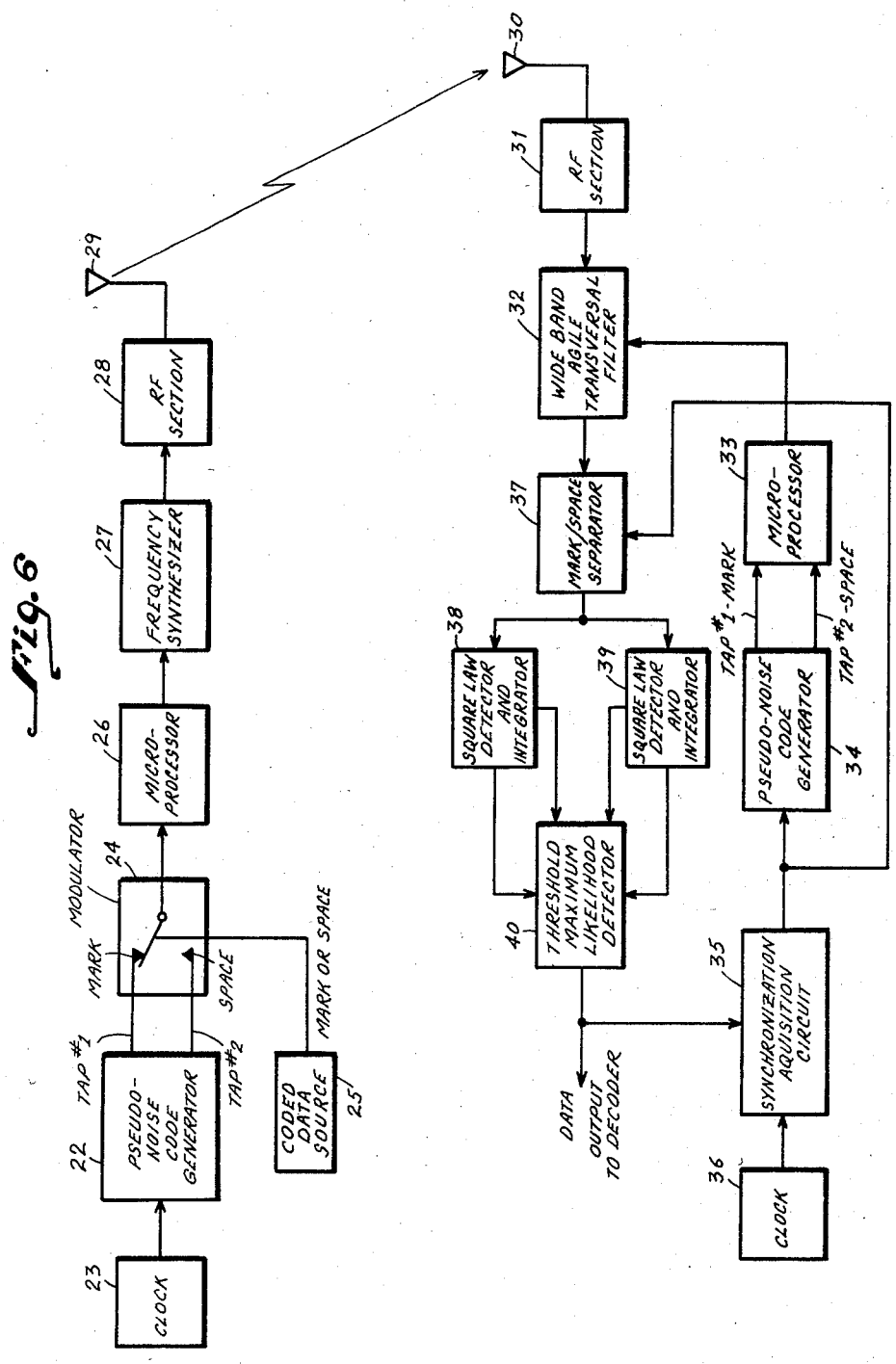

FREQUENCY HOPPING DATA COMMUNICATION SYSTEM

BACKGROUND OF THE INVENTION

The present invention relates to spread spectrum communication systems and more particularly to a frequency hopping data communication system.

Spread spectrum communication systems have been used in a variety of fields. In a communications system of this type, the transmitted bandwidth is much greater than the bandwidth or rate of the information to be transmitted. The carrier wave is modulated by some other function to widen or spread the bandwidth for transmission. The received signal is remapped into the original information bandwidth to reproduce a desired signal. The spread spectrum communication system has many useful advantages; a selective call is possible; since the power spectrum density is low, private communication is allowed; and it is little influenced by interference either due to multipath fading or jamming. From this standpoint, the spread spectrum system has found many uses, such as mobile communications, satellite communications, scatter communications of both the ionospheric and tropospheric type, avionics systems, direction finders and distance measurement equipment.

The spread spectrum system can be categorized into a direct sequence system, a frequency hopping system, a time hopping system and a hybrid system which is a proper combination of the just mentioned systems. Of these communications sytems, the frequency hopping system is frequently used in the field of mobile communications with low traffic volume for a number of stations, satellite communication systems, and scatter type communication systems where a fading environment is present.

In the frequency hopping system a carrier frequency is shifted or jumped in discrete increments in a random pattern dictated by prepared code sequences (e.g. pseudo-noise code, M-sequence codes, Gold codes and the like) in synchronism with a change in state of the codes. The resulting consecutive and time sequential frequency pattern is called a hopping pattern and the duration of each hopping frequency is called a chip. The transmitted frequency is embedded in the codes or embedded in each frequency of the carrier wave by a so-called FSK (frequency shift keyed) modulation. The information signal thus spread-spectrum-modulated is reproduced by a receiver.

In reproducing the information signal at the receiver, a synchronization acquisition process is first performed in which the code pattern provided in the receiver is made accurately coincident with the code pattern generated in the transmitter in time-position. Then, the spread spectrum signal is despread, and thereafter a well known demodulation is performed to extract the desired information. More particularly, a local reference signal of a frequency correspondingly determined by the same code pattern as that in the transmitter for every chip and the received signal are mixed in a mixer in order to perform a correlation (despreading) process for converting the spread spectrum signal into the signal having a frequency bandwidth wide enough to extract the information. This system is described in detail in "Spread Spectrum Systems" by R. C. Dixon, published by John Wiley & Sons, Inc. in 1976. Following this despreading process, the desired information is extracted by usual demodulation techniques.

Such a system is not only useful in obtaining a proper coherent transmission in a fading environment, such as is present in mobile communications, satellite communications and scatter communications, the system is also jammer resistant.

SUMMARY OF THE INVENTION

An object of the present invention is to provide an improved frequency hopping data communication system.

Another object of the present invention is to provide a frequency hopping data communication system which is extremely robust and is extremely difficult to jam.

Still another object of the present invention is to provide a frequency hopping data communication system which provides inherent diversity and anti-fading characteristics to the received signal.

A feature of the present invention is the provision of a frequency hopping data communications system comprising first means to produce identical first and second pseudo-noise code streams time displaced with respect to each other, each of the first and second code streams providing a frequency hopping rate equal to n times the rate of binary data being transmitted, where n is an integer; second means coupled to the first means, the second means being responsive to the data and the first and second code streams to provide a modulated signal for conveying the data, the modulated signal having different randomly occurring frequencies representing both binary conditions of the data and random spacing between the randomly occurring frequencies representing each of the binary conditions of the data, each bit of the data being represented by n of the randomly occurring frequencies; third means coupled to the second means to receive the modulated signal and to separate the randomly occurring frequencies representing each of the binary conditions from the received modulated signal; fourth means coupled to the third means to recover the data from the separated, received modulated signal; and fifth means coupled to the third means and the fourth means to synchronize the third means to the received modulated signal.

Another feature of the present invention is the provision of a frequency hopping data transmitter comprising first means to produce identical first and second pseudo-noise code streams time displaced with respect to each other, each of the first and second code streams providing a frequency hopping rate equal to n times the rate of binary data being transmitted, where n is an integer; and second means coupled to the first means, the second means being responsive to the data and the first and second code streams to provide a modulated signal for conveying the data, the modulated signal having different randomly occurring frequencies representing both binary conditions of the data and random spacing between the randomly occurring frequencies representing each of the binary conditions of the data, each bit of the data being represented by n of the randomly occurring frequencies.

A further feature of the present invention is the provision of a frequency hopping data receiver comprising first means to receive a transmitted signal for conveying binary data, the transmitted signal being produced from identical first and second pseudo-noise code streams time displaced with respect to each other, each of the first and second code streams having a frequency hopping rate equal to n times the rate of the data, where n is an integer, the transmitted signal having different randomly occurring frequencies representing both binary conditions of the data and random spacing between the randomly occurring frequencies representing each of the binary conditions of the data, each bit of the data being represented by n of the randomly occurring frequencies; second means coupled to the first means to separate the randomly occurring frequencies representing each of the binary conditions from the transmitted signal; third means coupled to the second means to recover the data from the separated, received modulated signal, and fourth means coupled to the second means and the third means to synchronize the second means to the received transmitted signal.

BRIEF DESCRIPTION OF THE DRAWING

Above-mentioned and other features and objects of this invention will become more apparent by reference to the following description taken in conjunction with the accompanying drawing, in which:

FIG. 5 is a block diagram of a first embodiment of a frequency hopping data communication system in accordance with the principles of the present invention; and FIG. 6 is a block diagram of a second embodiment of a frequency hopping data communication system in accordance with the principles of the present invention.

DESCRIPTION OF THE PREFERRED EMBODIMENTS

The major problem experienced to date in high frequency systems and high frequency slow hopping systems are that they can be jammed by repeater jammers. Hopping at slow speed was considered necessary due to the dispersive characteristics of the high frequency environment. The advantage against repeater jammers in a fast hopping system is mitigated by the fact that the time delay of the hopped signal can vary up to approximately 5 milliseconds. As such the receiver would of necessity stay open for periods of time longer than the transmitted hopped interval. The repeater jammer would receive our signal, smear it with noise and retransmit the signal in plenty of time to enter our receiver time window to jam our signal. The effects are particularly strong against digital signals requiring low bit error rates.

Figure 1:
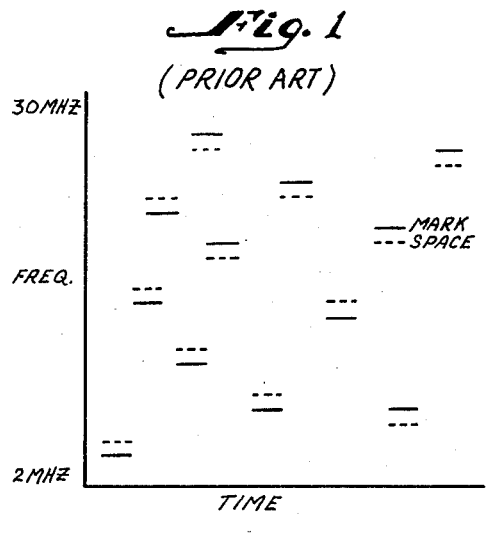
FIGS. 1 and 2 illustrate respectively a frequency versus time diagram and a receiver filter response diagram of prior art FSK systems.
Figure 2:
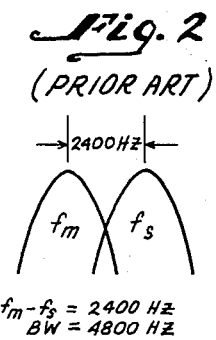

The effectiveness of the frequency hopping data communication system of the present invention can best be described by comparing the instant system to the standard FSK system. A standard FSK system will have a mark and space filter symetrically located around the carrier frequency within the receiver bandwidth (i.e., 2400 hertz) as illustrated in FIG. 2 with this precise constant spacing between the mark frequency and the space frequency being present regardless of how the signal is hopped as illustrated in FIG. 1. As such the prior art system can be jammed by the repeater jammer. The jammer simply receives one of our signals and retransmits it smeared with noise across both mark and space filters.

Figure 3:
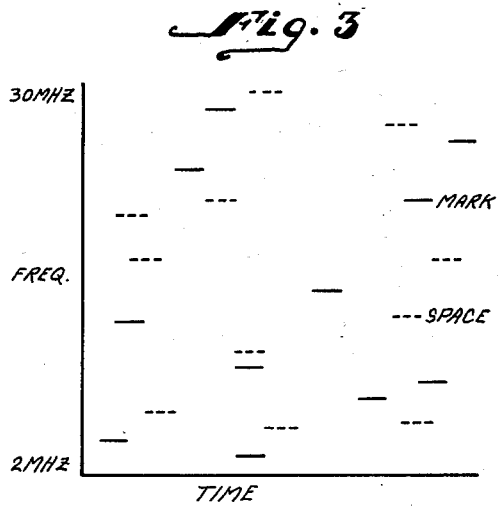
FIGS. 3 and 4 illustrate respectively a frequency versus time diagram and the FSK waveforms for a frequency hopping data communication system in accordance with the principles of the present invention.
Figure 4:
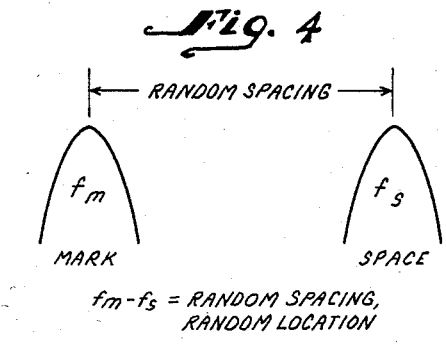

In the system of the present application only one frequency is transmitted at a time (the frequency selected on a bit instant by the code generators). The location of the mark and space frequencies will be randomly chosen over the whole bandwidth. Their location will be known at both ends of the link by the synchronized code generators. This arrangement is shown in FIGS. 3 and 4. If in the receiver we agree with the mark frequency, we know that a mark was sent and vice versa with the space frequency. At one instant then the frequency spacing could be as much as 28 megahertz or as little as 1200 hertz. The spacing between the mark and space frequencies will vary at a random rate as determined by code generators. Jammers upon receiving this signal and attempting to jam our system by smearing or adding additional energy will only add additional power to our received signal helping our detection process. The jammer cannot confuse our system by making the mark look like a space and vice versa, since he does not know the other frequency, not having our complex, non linear code generators set to the exact same timing and key variable.

The effective anti-jamming of any frequency hopping system will be proportional to the number of available frequency slots. For the system described herein as an example the hopping bandwidth could be from 2 to 38 megahertz, the channel bandwidth (receiver) will be approximately 2400 hertz. As such our anti-jamming processing gain can be as high as $$\frac{28 \times 10^6}{2400}$$

which is approximately 40 db (decibel).

The salient features of the system, in accordance with the principles of the present invention to provide an antijamming characteristic and to be relatively immune to a fading environment, are as follows:

1. Unique data modulation system which is a random frequency shift keying system.
2. Fast hopping (equal to or greater than one hop per transmitted bit).
3. Hopping over a wide bandwidth, for instance, between 2 and 30 megahertz in high frequency applications.
4. The use of non-linear or random code generators for frequency and modulation selections.
5. A transmission rate which will be independent of the data rate to hide data rate from an interceptor.
6. A randomly coded system which will improve anti-jamming capabilities by reducing data rate and increasing redundancies.

Referring to FIG. 5, one embodiment of the frequency hopping data communication system of the present invention is illustrated in block diagram form. The communication system to be described employs fast frequency hopping to avoid repeater jamming and/or coherent detection and to operate in a dispersive environment with the hopping rate being equal to or greater than the transmission data rate.

Two or more M-ary FSK random hop patterns will be generated from a common clock 1 by code generators. In the embodiment shown, a two level FSK signal is illustrated and thus two random hop patterns will be generated by a mark pseudo-noise code generator 2 and a space pseudo-noise code generator 3. The two code patterns of generators 2 and 3 will be coupled to a switching modulator 4 which may be an electronic switching arrangement controlled by the bits of the data input. The particular code pattern passed by modulator 4 will be on a bit by bit basis and will be determined by whether a mark or space bit is present in the data input. The output of modulator 4 is coupled to a frequency synthesizer which as an example includes a microprocessor 5 and a wideband agile transversal filter 6. Microprocessor 5 would have a table therein containing values each of which represent a different one of the random frequencies providing the frequency hopping. The microprocessor 5 responds to the numbers represented by the random code patterns at the output of modulator 4 to select the appropriate value from the value table so as to adjust the wideband agile transversal filter 6 quickly to the frequency desired to be sent which is dictated by the value transmitted from microprocessor 5. Filter 6 could be replaced by a programmable frequency synthesizer which then would be controlled by the microprocessor 5 having tables representing the frequencies to be generated by the frequency sythesizer. The random hopped frequencies at the output of filter 6 which represent either a mark or a space of the input data are coupled to a conventional radio frequency (RF) section 7 and, hence, to antenna 8 for transmission to antenna 9 and the RF section 10 of a remote receiver.

The code generators 2 and 3 can take the form described in U.S. Pat. No. 4,142,240 issued Feb. 27, 1978 to C. R. Ward and R. A. Reiley, assigned to the same assignee as the instant application, whose disclosure is incorporated herein by reference. Code generators 2 and 3 could be either the prior art arrangement of FIGS. 1 and 2 or the improved arrangement of FIG. 3 of this patent. The wideband agile transversal filter 6 can be of the type disclosed in U.S. Pat. No. 4,164,628 issued Aug. 14, 1979 to C. R. Ward and R. A. Reiley, assigned to the same assignee as the instant application, whose disclosure is incorporated herein by reference.

The output of RF section 10 in the receiver is coupled to a mark wideband agile transversal filter 11 and a space wideband agile transversal filter 12 so as to enable separation of the randomly occurring frequencies representing a mark and the randomly occurring frequencies representing a space. Filters 11 and 12 may be of the type described in the above cited U.S. Pat. No. 4,164,628.

Filter 11 is controlled by microprocessor 13 and the mark pseudo-noise code generator 14 which is synchronized to the transmitter by the synchronization acquisition circuit 15 which is coupled to clock 16 and the output data of the receiver. Circuit 15 operates to insure time coincidence between the mark and space code patterns produced in the receiver to those produced in the transmitter by generators 2 and 3. Acquisition circuit 15 produces synchronism by slipping the clock from clock 16 by removing bits of the clock until synchronization is achieved. Filter 12 is controlled by microprocessor 17 and space pseudo-noise code generator 18 which is synchronized by the output of synchronization acquisition circuit 15. The output of filters 11 and 12 are coupled to square law detector and integrators 19 and 20, respectively. The square law detectors and integrators 19 and 20 detect the power present in the signal passed by filters 11 and 12 to produce a threshold level control signal and likewise pass the signal from filters 11 and 12 to the threshold maximum likelihood detector 21. Detector 21 is a two level threshold detector with the amplitude threshold levels being controlled by the signals produced in the detectors 19 and 20 relative to the power of the frequency passed by filters 11 and 12. Detector 21 will pass only non-coincident signals that occur between the two threshold levels which are recognized as true mark or space signals thereby permitting the recovery of the data. Signals that occur below the lower threshold level and above the upper threshold levels are considered to be improper signals or jammer signals. When two signals simultaneously occur between the threshold levels these signals are also rejected as jammer or improper signals and are not considered in the data recovery process.

Referring to FIG. 6, a block diagram of a second embodiment of the freqeuency hopping data communication system of the present invention is illustrated. In this embodiment a single pseudo-noise code generator 22 which may be of any of the types disclosed in above cited U.S. Pat. No. 4,142,240. As Shown in FIG. 6, there are two taps or outputs for generator 22, one of which provides a mark code pattern and the other of which provides a space code pattern with these two patterns or pseudo-noise code streams of sequences being time displaced with respect to each other. Generator 22 is under control of clock 23 and the outputs of generator 22 are coupled to a switching modulator 24. Modulator 24 is under control of the mark and space signals from data source 25. During the occurrence of a mark, the mark code pattern is coupled to microprocessor 26 and during the occurrence of a space signal the space code pattern is coupled to microprocessor 26. Microprocessor 26 contains therein tables of values representing the different randomly occurring frequencies that are to be generated by frequency synthesizer 27. Synthesizer 27 and microprocessor 26 operate much in the same manner as microprocessor 5 and synthesizer 6 of FIG. 5. The output of synthesizer 27 is coupled to the RF section 28 and, hence, to antenna 29 for transmission to a remote receiver with the hopped signals being received on antenna 30 for coupling to the receiver RF section 31.

Here as in the embodiment of FIG. 5 the two data streams produced by code generator 22 or the two code generators 2 and 3 of FIG. 5 have a frequency hopping rate equal to or greater than the rate of the binary data being transmitted so that at least one randomly occurring frequency represents each bit of the data.

The output of RF section 31 is coupled to a wideband agile transversal filter 32 which may be of the type disclosed in the above cited U.S. Pat. No. 4,164,628. Filter 32 is under control of microprocessor 33 and pseudo-noise code generator 34. Pseudo-noise code generator 34 is of the type described hereinabove with respect to code generator 22, namely, providing two taps each of which provides a different one of a mark and space code pattern or pseudo-noise code stream. Microprocessor 33 has a table of the same values as the tables contained in microprocessor 26 so that the response of the transversal filter 32 will be time shared and will pass the randomly occurring frequencies representing a mark and a space. To insure that the code patterns of code generator 34 are in synchronism with the code patterns produced in code generator 22, a synchronization acquisition circuit 35 substantially identical with the synchronization acquisition circuit 15 of the embodiment of FIG. 5 is provided coupled to be responsive to the output data of the receiver so that clock bits from clock 36 can be removed to cause a slipping of the clock signal driving the code generator 34 until synchronization is achieved. The synchronized clock signal is likewise coupled to mark/space separator 37 so that the mark output of filter 32 is coupled to square law detector and integrator 38 and the space output of filter 32 is coupled to square law detector and intergrator 39. Square law detectors and integrators 38 and 39 are the same type described hereinabove with respect to square law detectors and integrators 19 and 20 of the embodiment of FIG. 5. The output of square law detectors and integrators 38 and 39 are coupled to threshold maximum likelinood detector 40. As mentioned hereinabove with respect to detector 21 of the embodiment of FIG. 5, two amplitude threshold levels are provided. These threshold levels are controlled by signals representing the power present in the signal being processed by detectors and integrators 38 and 39 so that the amplitude thresholds of detector 40 are adjusted depending upon the signal anticipated to be present in detectors and integrators 38 and 39. As mentioned hereinabove with respect to detector 21, detector 40 passes only those noncoincident signals that occur between the two threshold levels as a data output. Signals occurring simultaneously between the two thresholds or above the upper threshold and below the lower threshold are discarded as either jamming signals or other interfering signals.

As mentioned hereinabove with respect to both embodiment of FIGS. 5 and 6, final synchronization is achieved by acquisition of circuits 15 and 35. It should be noted that clocks 1 and 16 of the embodiment of FIG. 5 and clocks 23 and 36 of the embodiment of FIG. 6 would be accurate enough so that if they were set once every twenty four hours the only synchronization correction necessary would be due to fading or other multi-path phenomenon.

While I have described above the principles of my invention in connection with specific apparatus, it is to be clearly understood that this description is made only by way of example and not as a limitation to the scope of my invention as set forth in the objects thereof and in the accompanying claims.

I claim:

1. A frequency hopping binary data communication system comprising:
   first means to produce identical first and second pseudo-noise code streams time displaced with respect to each other, each of said first and second code streams providing a frequency hopping rate equal to n times the rate of binary said data being transmitted, where n is an integer;
   second means coupled to said first means, said second means being responsive to said binary data and said first and second code streams to provide a modulated signal for conveying said binary data, said modulated signal having different randomly occurring frequencies representing both binary conditions of said binary data and random spacing between said randomly occurring frequencies representing each of said binary conditions of said data, each bit of said binary data being represented by n of said randomly occurring frequencies;
   third means coupled to said second means to receive said modulated signal and to separate said randomly occurring frequencies representing each of said binary conditions from said received modulated signal;
   fourth means coupled to said third means to recover said data from said separated, received modulated signal; and
   fifth means coupled to said third means and said fourth means to synchronize said third means to said received modulated signal.

2. A system according to claim 1, wherein
said first means includes
   a first pseudo-noise code generator to provide said first code stream, and
   a second pseudo-noise code generator to provide said second code stream.

3. A system according to claim 2, wherein
said second means includes
   switching means coupled to said first and second code generators responsive to said binary data to couple said first code stream to its output upon each occurrence of one of said binary conditions and to couple said second code stream to its output upon each occurrence of the otner of said binary conditions,
   a first microprocessor coupled to said output of said switching means, said first microprocessor having a table of first values each of which represents a different one of said different random frequencies for both of said binary conditions, said first microprocessor responsive to said first and second code streams to sequentially couple predetermined ones of said first values to its output, and
   frequency generating means coupled to said output of said first microprocessor responsive to said predetermined ones of said first values to provide said different randomly occurring frequencies for both of said binary conditions.

4. A system according to claim 3, wherein
said third means includes
   a third pseudo-noise code generator coupled to a local clock means having said hopping rate to provide a third pseudo-noise code stream identical with one of said first and second code streams,
   a fourth pseudo-noise code generator coupled to said system clock to provide a fourth pseudo-noise code stream identical with the other of said first and second code streams,
   a second microprocessor coupled to said third code generator, said second microprocessor having a table of second values each of which represents a different one of said different random frequencies for one of said binary conditions and responding to said third code stream to sequentially couple predetermined ones of said second values to its output,
   a third microprocessor coupled to said fourth code generator, said third microprocessor having a table of third values each of which represents a different one of said different random frequencies for the other of said binary conditions and responding to said fourth code stream to sequentially couple predetermined ones of said third values to its output,
   a first frequency responsive means coupled to said second means and said second microprocessor to pass said randomly occurring frequencies representing said one of said binary condition of said received modulated signal, and a second frequency responsive means coupled to said second means and said third microprocessor to pass said randomly occurring frequencies representing said other of said binary conditions of said received modulated signal.

5. A system according to claim 4, wherein said fourth means includes first power detecting and integrating means coupled to said first frequency responsive means to produce a first signal proportional to power in each frequency signal coupled thereto and to pass said frequency signals coupled thereto, second power detecting and integrating means coupled to said second frequency responsive means to produce a second signal proportional to power in each frequency signal coupled thereto and to pass said frequency signals coupled thereto, and threshold detecting means coupled to said first and second power detecting and integrating means, said threshold detecting means having two spaced amplitude threshold levels controlled by said first and second power signals and passing only those frequency signals coupled thereto in a non-coincident manner having an amplitude disposed between said two threshold levels.

6. A system according to claim 5, wherein said fifth means includes synchronization acquisition means coupled to the output of said threshold detecting means, said third and fourth code generators and said system clock responsive to said recovered data and said system clock to synchronize said third and fourth code streams with said received modulated signal.

7. A system according to claim 1, wherein said second means includes switching means coupled to said first means responsive to said binary data to couple said first code stream to its output upon each occurrence of one of said binary conditions and to couple said second code stream to its output upon each occurrence of the other of said binary conditions, a first microprocessor coupled to said output of said switching means, said first microprocessor having a table of first values each of which represents a different one of said different random frequencies for both of said binary conditions, said first microprocessor responding to said first and second code streams to sequentially couple predetermined ones of said first values to its output, and frequency generating means coupled to said output of said first microprocessor responsive to said predetermined ones of said first values to provide said different randomly occurring frequencies for both of said binary conditions.

8. A system according to claim 7, wherein said third means includes a first pseudo-noise code generator coupled to a system clock having said hopping rate to provide a third pseudo-noise code stream identical with one of said first and second code streams, a second pseudo-noise code generator coupled to said system clock to provide a fourth pseudo-noise code stream identical with the other of said first and second code streams, a second microprocessor coupled to said first code generator, said second microprocessor having a table of second values each of which represents a different one of said different random frequencies for one of said binary conditions and responding to said third code stream to sequentially couple predetermined ones of said second values to its output, a third microprocessor coupled to said second code generator, said third microprocessor having a table of third values each of which represents a different one of said different random frequencies for the other of said binary conditions and responding to said fourth code stream to sequentially couple predetermined ones of said third values to its output, a first frequency responsive means coupled to said second means and said second microprocessor to pass said randomly occurring frequencies representing said one of said binary conditions of said received modulated signal, and a second frequency responsive means coupled to said second means and said third microprocessor to pass said randomly occurring frequencies representing said other of said binary conditions of said received modulated signal.

9. A system according to claim 8, wherein said fourth means includes first power detecting and integrating means coupled to said first frequency responsive means to produce a first signal proportional to power in each frequency signal coupled thereto and to pass said frequency signals coupled thereto, second power detecting and integrating means coupled to said second frequency responsive means to produce a second signal proportional to power in each frequency signal coupled thereto and to pass said frequency signals coupled thereto, and threshold detecting means coupled to said first and second power detecting and integrating means, said threshold detecting means having two spaced amplitude threshold levels controlled by said first and second signals and passing only those frequency signals coupled thereto in a non-coincident manner having an amplitude disposed between said two threshold levels.

10. A system according to claim 9, wherein said fifth means includes synchronization acquisition means coupled to the output of said threshold detecting means, said first and second code generators and said system clock to synchronize said third and fourth code streams with said received modulated signal.

11. A system according to claim 1, wherein said third means includes first pseudo-noise code generator coupled to a system clock having said hopping rate to provide a third pseudo-noise code stream identical with one of said first and second code streams, a second pseudo-noise code generator coupled to said system clock to provide a fourth pseudo-noise code stream identical with the other of said first and second code streams, a first microprocessor coupled to said first code generator, said first microprocessor having a table of first values each of which represents a different one of said different random frequencies for one of said binary conditions and responding to said third code stream to sequentially couple predetermined ones of said first values to its output, a second microprocessor coupled to said second code generator, said second microprocessor having a table of second values each of which represents a different one of said different random frequencies for the other of said binary conditions and responding to said fourth code stream to sequentially couple predetermined ones of said third values to its output, a first frequency responsive means coupled to said second means and said first microprocessor to pass said randomly occurring frequencies representing said one of said binary conditions of said receiver modulated signal, and a second frequency responsive means coupled to said second means and said second microprocessor to pass said randomly occurring frequencies representing said other of said binary conditions of said received modulated signal.

12. A system according to claim 11, wherein
said fourth means includes
first power detecting and integrating means coupled to said first frequency responsive means to produce a first signal proportional to power in each frequency signal coupled thereto and to pass said frequency signals coupled thereto,
second power detecting and integrating means coupled to said second frequency responsive means to produce a second signal proportional to power in each frequency signal coupled thereto and to pass said frequency signals coupled thereto, and
threshold detecting means coupled to said first and second power detecting and integrating means, said threshold detecting means having two spaced amplitude threshold levels controlled by said first and second signals and passing only those frequency signals coupled thereto in a non-coincident manner having an amplitude disposed between said two threshold levels.

13. A system according to claim 12, wherein
said fifth means includes
synchronization acquisition means coupled to the output of said threshold detecting means, said first and second code generators and said system clock responsive to said recovered data and said system clock to synchronize said third and fourth code streams with said received modulated signal.

14. A system according to claim 1, wherein
said fourth means includes
first power detecting and integrating means coupled to said third means to produce a first signal proportional to power in each frequency signal coupled thereto and to pass said frequency signals coupled thereto,
second power detecting and integrating means coupled to said third means to produce a second signal proportional to power in each frequency signal coupled thereto and to pass said frequency signal coupled thereto, and
threshold detecting means coupled to said first and second power detecting and integrating means, said threshold detecting means having two spaced amplitude threshold levels controlled by said first and second signals and passing only those frequency signals coupled thereto in a non-coincident manner having an amplitude disposed between said two threshold levels.

15. A system according to claim 14, wherein
said fifth means includes
synchronization acquisition means coupled to the output of said threshold detecting means, said third means and said system clock responsive to said recovered data and said system clock to synchronize said third means with said received modulated signal.

16. A system according to claim 1, wherein
said fifth means includes
synchronization acquisition means coupled to the output of said fourth means, said third means and a local clock means responsive to said recovered data and said system clock to synchronize said third means with said received modulated signal.

17. A system according to claim 1, wherein
said first means includes
a first pseudo-noise code generator having a pair of taps disposed to provide said first and second code streams time displaced with respect to each other.

18. A system according to claim 17, wherein
said second means includes
switching means coupled to said first code generator responsive to said binary data to couple said first code stream to its output upon each occurrence of one of said binary conditions and to couple said second code stream to its output upon each occurrence of the other of said binary conditions,
a first microprocessor coupled to said output of said switching means, said first microprocessor having a table of values each of which represents a different one of said different randomly occurring frequencies, said first microprocessor responding to said first and second code streams to sequentially couple predetermined ones of said values to its output, and
frequency generating means coupled to said output of said first microprocessor responsive to said predetermined ones of values to provide said different randomly occurring frequencies for both of said binary conditions.

19. A system according to claim 18, wherein
said third means includes
a second pseudo-noise code generator coupled to a system clock having said hopping rate, said second code generator having a pair of taps disposed to provide third and fourth pseudo-noise code streams identical with said first and second pseudo-noise code stream,
a second microprocessor coupled to said second code generator, said second microprocessor having said table of values and responding to said third and fourth code streams to sequentially couple predetermined ones of said values repesenting said randomly occurring frequencies of both of said binary conditions to its output,
a frequency responsive means coupled to said second means and said second microprocessor to pass said randomly occurring frequencies representing both of said binary conditions of said received modulated signal, and separator means coupled to said system clock and said frequency responsive means to separate said randomly occurring frequencies representing each of said binary conditions from said received modulated signal passed by said frequency responsive means.

20. A system according to claim 19, wherein said fourth means includes first power detecting and integrating means coupled to said separator means to produce a first signal proportional to power in each of said different randomly occurring frequencies representing one of said binary conditions coupled thereto and to pass frequency signals coupled thereto, a second power detecting and integrating means coupled to said separator means to produce a second signal proportional to power in each of said different randomly occurring frequencies representing the other of said binary conditions coupled thereto and to pass frequency signals coupled thereto, and threshold detecting means coupled to said first and second power detecting and integrating means, said threshold detecting means having two spaced amplitude threshold levels controlled by said first and second power signals and passing only those frequency signals coupled thereto in a non-coincident manner having an amplitude disposed between said two threshold levels.

21. A system according to claim 20, wherein said fifth means includes synchronization acquisition means coupled to the output of said threshold detecting means, said second code generator and said system clock responsive to said recovered data and said system clock to synchronize said third and fourth code streams with said received modulated signal.

22. A system according to claim 1, wherein said second means includes switching means coupled to said first means responsive to said binary data to couple said first code streams to its output upon each occurrence of one of said binary conditions and to couple said second code stream to its output upon each occurrence of the other of said binary conditions, a first microprocessor coupled to said output of said switching means, said first microprocessor having a table of values each of which represents a different one of said different random frequencies, said first microprocessor responding to said first and second code streams to sequentially couple predetermined ones of said values to its output, and frequency generating means coupled to said output of said first microprocessor responsive to said predetermined ones of said values to provide said different randomly occurring frequencies for both of said binary conditions.

23. A system according to claim 22, wherein said third means includes a pseudo-noise code generator coupled to a system clock having said hopping rate, said code generator having a pair of taps disposed to provide third and fourth pseudo-noise code streams identical with said first and second pseudo-noise code streams, a second microprocessor coupled to said code generator, said second microprocessor having said table of values and responding to said third and fourth code streams to sequentially couple predetermined ones of said values representing said randomly occurring frequencies of both of said binary conditions of its output, a frequency responsive means coupled to said second means and said second microprocessor to pass said randomly occurring frequencies representing both of said binary conditions of said received modulated signal, and separator means coupled to said system clock and said frequency responsive means to separate said randomly occurring frequencies representing each of said binary conditions from said received modulated signal passed by said frequency responsive means.

24. A system according to claim 23, wherein said fourth means includes first power detecting and integrating means coupled to said separator means to produce a first signal proportional to power in each of said different randomly occurring frequencies representing one of said binary conditions coupled thereto and to pass frequency signals coupled thereto, a second power detecting and integrating means coupled to said separator means to produce a second signal proportional to power in each of said different randomly occurring frequencies representing the others of said binary conditions coupled thereto and to pass frequency signals coupled thereto, and threshold detecting means coupled to said first and second power detecting and integrating means, said threshold detecting means having two spaced amplitude threshold levels controlled by said first and second power signals and passing only those frequency signals coupled thereto in a non-coincident manner having an amplitude disposed between said two threshold levels.

25. A system according to claim 24, wherein said fifth means includes synchronization acquisition means coupled to the output of said threshold detecting means, said code generator and said system clock responsive to said recovered data and said system clock to synchronize said third and fourth code streams with said received modulated signal.

26. A system according to claim 1, wherein said third means includes a pseudo-noise code generator coupled to a system clock having said hopping rate, said code generator having a pair of taps disposed to provide third and fourth pseudo-noise code streams identical with said first and second pseudo-noise code streams, a microprocessor coupled to said code generator, said microprocessor having a table of values each of which represents a different one of said different random frequencies, said microprocessor responding to said third and fourth code streams to sequentially couple predetermined ones of said values representing said randomly occurring frequencies of both of said binary conditions to its output, a frequency responsive means coupled to said second means and said microprocessor to pass said randomly occurring frequencies representing both of said binary conditions of said received modulated signal, and separator means coupled to said systems clock and said frequency responsive means to separate said randomly occurring frequencies representing each of said binary conditions from said received modulated signal passed by said frequency responsive means.

27. A system according to claim 26, wherein said fourth means includes first power detecting and integrating means coupled to said separator means to produce a first signal proportional to power in each of said different randomly occurring frequencies representing one of said binary conditions coupled thereto and to pass frequency signals coupled thereto, a second power detecting and integrating means coupled to said separator means to produce a second signal proportional to power in each of said different randomly occurring frequencies representing the other of said binary conditions coupled thereto and to pass frequency signals coupled thereto, and threshold detecting means coupled to said first and second power detecting and integrating means, said threshold detecting means having two spaced amplitude threshold levels controlled by said first and second power signals and passing only those frequency signals coupled thereto in a non-coincident manner having an amplitude disposed between said two threshold levels.

28. A system according to claim 27, wherein said fifth means includes synchronization acquisition means coupled to the output of said threshold detecting means, said code generator and said system clock responsive to said recovered data and said system clock to synchronize said third and fourth code streams with said received modulated signal.

29. A system according to claim 1, wherein said fourth means includes first power detecting and integrating means coupled to said third means to produce a first signal proportional to power in each of said different randomly occurring frequencies representing one of said binary conditions coupled thereto and to pass frequency signals coupled thereto, a second power detecting and integrating means coupled to said third means to produce a second signal proportional to power in each of said different randomly occurring frequencies representing the other of said binary conditions coupled thereto and to pass frequency signals coupled thereto, and threshold detecting means coupled to said first and second power detecting and integrating means, said threshold detecting means having two spaced amplitude threshold levels controlled by said first and second power signals and passing only those frequency signals coupled thereto in a non-coincident manner having an amplitude disposed between said two threshold levels.

30. A system according to claim 29, wherein said fifth means includes synchronization acquisition means coupled to the output of said threshold detecting means, said third means and said system clock responsive to said recovered data and said system clock to synchronize said third means with said received modulated signal.

31. A frequency hopping binary data receiver comprising:

first means to receive a transmitted signal for conveying binary data, said transmitted signal being produced from identical first and second pseudo-noise code streams time displaced with respect to each other, each of said first and second code streams having a frequency hopping rate equal to n times the rate of said binary data, where n is an integer, said transmitted signal having different randomly occurring frequencies representing both binary conditions of said data and random spacing between said randomly occurring frequencies representing each of said binary conditions of said binary data, each bit of said binary data being represented by n of said randomly occurring frequencies;

second means coupled to said first means to separate said randomly occurring frequencies representing each of said binary conditions from said transmitted signal;

third means coupled to said second means to recover said binary data from said separated, received modulated signal, and fourth means coupled to said second means and said third means to synchronize said second means to said received transmitted signal.

32. A receiver according to claim 31, wherein said second means includes a first pseudo-noise code generator coupled to a system clock having said hopping rate to provide a third pseudo-noise code stream identical with the one of said first and second code streams, a second pseudo-noise code generator coupled to said system clock to provide a fourth pseudo-noise code stream identical with the other of said first and second code streams, a first microprocessor coupled to said first code generator, said first microprocessor having a table of first values each of which represents a different one of said different random frequencies for one of said binary conditions and responding to said third code stream to sequentially couple predetermined ones of said first values to its output, a second microprocessor coupled to said second code generator, said second microprocessor having a table of second values each of which represents a different one of said different random frequencies for the other of said binary conditions and responding to said fourth code stream to sequentially couple predetermined ones of said second values to its output, a first frequency responsive means coupled to said first means and said first microprocessor to pass said randomly occurring frequencies representing said one of said binary condition of said recieved modulated signal, and a second frequency responsive means coupled to said first means and said second microprocessor to pass said randomly occurring frequencies representing said other of said binary conditions of said received modulated signal.

33. A receiver according to claim 32, wherein said third means includes
   first power detecting and integrating means coupled to said first frequency responsive means to produce a first signal proportional to power in each frequency signal coupled thereto and to pass said frequency signals coupled thereto,
   second power detecting and integrating means coupled to said second frequency responsive means to produce a second signal proportional to power in each frequency signal coupled thereto and to pass said frequency signals coupled thereto, and
   threshold detecting means coupled to said first and second power detecting and integrating means, said threshold detecting means having two spaced amplitude threshold levels controlled by said first and second power signals and passing only those frequency signals coupled thereto in a non-coincident means having an amplitude disposed between said two threshold levels.

34. A receiver according to claim 33, wherein said fourth means includes
   synchronization acquistion means coupled to the output of said threshold detecting means, said first and second code generators and said system clock responsive to said recovered data and said system clock to synchronize said third and fourth code streams with said received transmitted signal.

35. A receiver according to claim 31, wherein said third means includes
   first power detecting and integrating means coupled to said second means to produce a first signal proportional to power in each frequency signal coupled thereto and to pass said frequency signals coupled thereto,
   second power detecting and integrating means coupled to said second means to produce a second signal proportional to power in each frequency signal coupled thereto and to pass said frequency signals coupled thereto, and
   threshold detecting means coupled to said first and second power detecting and integrating means, said threshold detecting means having two spaced amplitude threshold levels controlled by said first and second power signals and passing only those frequency signals coupled thereto in a non-coincident means having an amplitude disposed between said two threshold levels.

36. A receiver according to claim 35, wherein said fourth means includes
   synchronization acquistion means coupled to the output of said threshold detecting means, said second means and local clock means responsive to said recovered data and said system clock to synchronize said second means with said received transmitted signal.

37. A receiver according to claim 31, wherein said fourth means includes
   synchronization acquisition means coupled to the output of said third means, said second means and local clock means responsive to said recovered data and said system clock to synchronize said second means with said received transmitted signal.

38. A system according to claim 31, wherein said second means includes
   a pseudo-noise code generator coupled to a system clock having said hopping rate, said code generator having a pair of taps disposed to provide third and fourth pseudo-noise code streams identical with said first and second pseudo-noise code streams,
   a microprocessor coupled to said code generator, said microprocessor having a table of values each of which represents a different one of said different randomly occurring frequencies and responding to said third and fourth code streams to sequentially couple predetermined ones of said values representing said randomly occurring frequencies of both of said binary conditions to its output,
   a frequency responsive means coupled to said first means and said microprocessor to pass said randomly occurring frequencies representing both of said binary conditions of said received transmitted signal, and
   separator means coupled to said system clock and said frequency responsive means to separate said randomly occurring frequencies representing each of said binary conditions from said received transmitted signal passed by said frequency responsive means.

39. A receiver according to claim 38, wherein said third means includes
   first power detecting and integrating means coupled to said separator means to produce a first signal proportional to power in each of said different randomly occurring frequencies representing one of said binary conditions coupled thereto and to pass frequency signals coupled thereto,
   a second power detecting and integrating means coupled to said separator means to produce a second signal proportional to power in each of said different randomly occurring frequencies representing the other of said binary conditions coupled thereto and to pass frequency signals coupled thereto, and
   threshold detecting means coupled to said first and second power detecting and integrating means, said threshold detecting means having two spaced amplitude threshold levels controlled by said first and second power signals and passing only those frequency signals coupled thereto in a non-coincident manner having an amplitude disposed between said two threshold levels.

40. A receiver according to claim 39, wherein said fourth means includes
   synchronization acquistion means coupled to the output of said threshold detecting means, said code generator and said system clock responsive to said recovered data and said system clock to synchronize said third and fourth code streams with said received transmitted signal.

41. A receiver according to claim 31, wherein said third means includes
   first power detecting and integrating means coupled to said second means to produce a first signal proportional to power in each of said different randomly occurring frequencies representing one of said binary conditions coupled thereto and to pass frequency signals coupled thereto, a second power detecting and integrating means coupled to said second means to produce a second signal proportional to power in each of said different randomly occurring frequencies representing the other of said binary conditions coupled thereto and to pass frequency signals coupled thereto, and threshold detecting means coupled to said first and second power detecting and integrating means, said threshold detecting means having two spaced amplitude threshold levels controlled by said first and second power signals and passing only those frequency signals coupled thereto in a non-coincident manner having an amplitude disposed between said two threshold levels.

42. A receiver according to claim 41, wherein said fourth means includes
synchronization acquisition means coupled to the output of said threshold detecting means, said second means and said system clock responsive to said recovered data and said system clock to synchronize said second means with said received modulated signal.

* * * * *